June 14, 1966 A. A. BERG ET AL 3,255,676
DELAYED ACTION SPRING BRAKE ASSEMBLY
Filed Aug. 22, 1962 3 Sheets-Sheet 1

INVENTORS.
ARTHUR A. BERG
HAROLD L. DOBRIKIN
CHARLES HOROWITZ
BY *Parker & Carter*
ATTORNEYS.

INVENTORS.
ARTHUR A. BERG
HAROLD L. DOBRIKIN
CHARLES HOROWITZ
BY Parker & Carter
ATTORNEYS.

United States Patent Office 3,255,676
Patented June 14, 1966

3,255,676
DELAYED ACTION SPRING BRAKE ASSEMBLY
Arthur A. Berg, Lincolnwood, Harold L. Dobrikin, Highland Park, and Charles Horowitz, Chicago, Ill., assignors, by mesne assignments, to Berg Mfg. & Sales Co., Des Plaines, Ill., a corporation of Illinois
Filed Aug. 22, 1962, Ser. No. 218,584
10 Claims. (Cl. 92—29)

This invention relates to brake mechanisms for vehicles and the like and has particular relation to an emergency brake-operating mechanism.

Vehicle brake systems conventionally employ a braking element associated with the vehicle wheel, an operating lever or wedge arrangement to move the braking element into contact with the wheel, and a power means, usually fluid-pressure operated, such as a pneumatic or hydraulic cylinder and piston or diaphragm assembly arranged to operate the lever or wedge members by delivery from the normal fluid power system of the vehicle of fluid pressure to the pneumatic or hydraulic cylinder. In the past it has been known to attach to or associate with the main or normal brake-operating fluid power cylinder, an emergency chamber having a piston or diaphragm and an operating member extending into the main fluid power cylinder, the piston or diaphragm being held normally inactive by fluid from the vehicle fluid power system and a powerful spring operative against the piston or diaphragm to move the operating element in response to a diminution or loss of fluid pressure within said emergency chamber, thus actuating the main power system to apply the brakes. The requirement for minimum weight and minimum size, coupled with the necessity for taking up the slack in the brake system during the initial stroke of the emergency spring have combined to create serious problems in supplying sufficient spring force to adequately brake the vehicle during that portion of the spring stroke in which the brakes are actually applied. So much of the spring force has, in the past, been dissipated during the slack-absorbing portion of the spring stroke as to require the initial provision of excess spring forces, thus increasing the weight and size of the emergency chamber. Prior efforts to solve this problem have been directed in the area of the provision of a plurality of springs and the design and application of springs of particular conformations. It is accordingly one purpose of the invention to provide a mechanism effective to deliver the maximum force of the emergency brake-operating spring during the actual brake-applying operation of the brake system.

Another purpose is to provide an emergency brake-operating assembly in which the brake-applying action of a spring is delayed until the brake system slack has been taken up.

Another purpose is to provide an emergency brake system in which pressure of a given amount is initially employed in taking up a brake system slack and pressure of another amount is employed in the actual application of the brakes.

Another purpose is to provide an emergency brake mechanism having means responsive to the diminution of brake system pressure to a predetermined level for taking up the slack in a brake system and means responsive to further diminution of said pressure for applying the brakes of the vehicle.

Another purpose is to provide an emergency brake-applying mechanism having means for actuating a brake assembly to absorb the slack therein and additional means thereafter operative with said first-named means for applying the brakes of said system.

Another purpose is to provide a brake-actuating mechanism having means for applying an initial pressure to absorb the slack in a brake system and additional means arranged for automatic operation thereafter to apply the brakes.

Another purpose is to provide an emergency brake-applying mechanism having means movable to absorb the slack in a brake system and additional means movable to apply the brakes of said system, and means for locking said slack-absorbing and brake-applying means together for subsequent simultaneous operation.

Another purpose is to provide an emergency brake-applying mechanism having an element movable to absorb the slack in a brake system, means for locking said elements together for simultaneous movement and means for releasing said lock means to permit independent movement of said elements.

Another purpose is to provide an emergency brake chamber of minimum length and consequently of reduced weight.

Another purpose is to provide an emergency brake-applying mechanism including a slack-absorbing element and a brake-applying element, said elements being responsive to diminution of fluid pressure in a fluid pressure system.

Another purpose is to provide an emergency brake-applying assembly having a slack-absorbing element and a brake-applying element, and means responsive to fluid pressure for locking and releasing said elements respectively for simultaneous and independent operation.

Other purposes will appear from time to time during the course of the specification and claims.

The invention is illustrated more or less diagrammatically in the accompanying drawings, wherein.

Like parts are indicated by like numerals throughout the specification and drawings.

Figure 1:
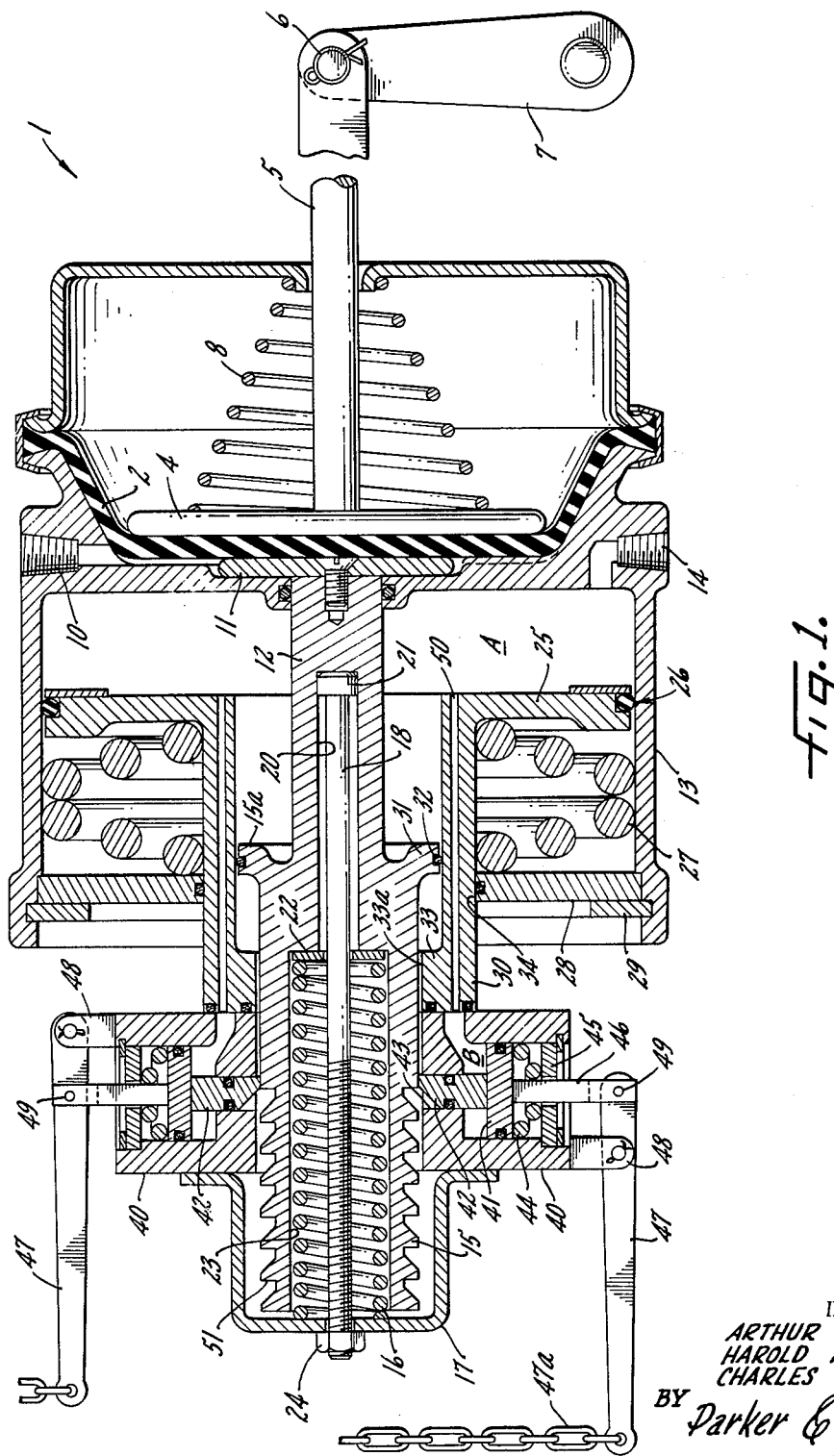
FIGURE 1 is a side elevation in partial cross-section illustrating one form of the invention.

Referring now to the drawings, and particularly to FIGURE 1, the numeral 1 generally designates a brake chamber. The chamber 1 is divided by a diaphragm 2. A pad 4 is positioned against one side of diaphragm 2 and an operating rod 5 is secured to pad 4 and extends outwardly from housing 1 for operating connection, as at 6, to a brake-operating lever 7. Yielding means 8 is positioned in housing 1 and is effective to urge pad 4 inwardly of housing 1, against diaphragm 2, and away from brake-operating direction. A fluid pressure inlet 10 is formed in housing 1 to deliver fluid pressure to the opposite side of diaphragm 2 from that in contact with pad 4.

A pad 11 is positioned in housing 1 on the opposite side of diaphragm 2 from pad 4 and is secured to a rod 12 which in turn extends outwardly of housing 1 and into an emergency cylinder 13 which may be attached to or integrally formed with housing 1. An inlet 14 is provided for delivery of fluid pressure to the chamber A in cylinder 13. A first piston 15 is attached to or integrally formed with rod 12. A yielding means such as the spring 16 is operative against piston 15 and a closure cap 17 to urge piston 15 toward housing 1. A retaining rod 18 extends through cap 17 and into a well 20 within piston 15 and piston rod 12. The inner end of rod 18 carries a head 21 which may be drawn against a spring-urged plate 22 yieldingly held by spring 16 in the bottom of an enlarged well 23 in piston 15 which is occupied by spring 16. When head 21 is held against plate 22 by withdrawal of rod 18, as by turning the nut 24, the spring 16 is rendered inactive.

A second or brake-applying piston 25 is reciprocally mounted in cylinder 13 and has a sealing engagement with the inner cylindrical surface of cylinder 13 as indicated at 26. A spring 27, having a force substantially greater than that of spring 16, is operative against piston 25 to urge the same toward housing 1, the opposite end of spring 27 being in contact with a closure plate 28 closing the opposite end of cylinder 13 from housing 1. A retainer ring 29 holds plate 28 against escape from cylinder 13.

A hollow cylindrical central or axial extension 30 extends rearwardly from piston 25 and an annular flange or segment 31 of piston 15 slidably engages the inner cylindrical surface of extension 30 with which it has a sealing engagement as indicated at 32. An inwardly extending annular portion 33 is formed on the outer end of extension 30 beyond a central aperture 34 which is formed in end plate 28 and in which extension 30 is reciprocally mounted. A major segment of piston 15 is slidably received in annulus 33 as indicated at 33a.

Carried at the outer end of extension 30 and secured thereto by suitable means (not shown) is a plurality of laterally disposed lock housings 40. Since these are identical it will, for convenience, be sufficient to describe one of said housings and the elements therein. A lock piston 41 is reciprocally mounted in the housing 40 and carries a keeper 42 extending through an aperture 43 in the bottom wall of housing 40. Operative against the opposite face of piston 41 from the keeper 42 is a spring 44, the opposite end of which is in contact with a housing closure plate 45 to urge the piston 41 and keeper 42 inwardly toward piston 15. A rod 46 is secured to piston 41 and extends outwardly of housing 40. A release lever 47 is fulcrumed to housing 40 as indicated at 48 and has an operative connection with rod 46 as indicated at 49. Lanyard 47a is provided for manual operation of lever 47. A passage 50 extends through extension 30 and places the emergency fluid pressure chamber A within cylinder 13 in communication with the chamber B in lock housing 40 on that side of piston 41 from which keeper 42 extends.

The outer surface of piston 15 has a toothed or rack formation 51 formed thereon for engagement by and mating with an opposed mating surface on keeper 42 when keeper 42 is moved outwardly of housing 40.

Figure 2:
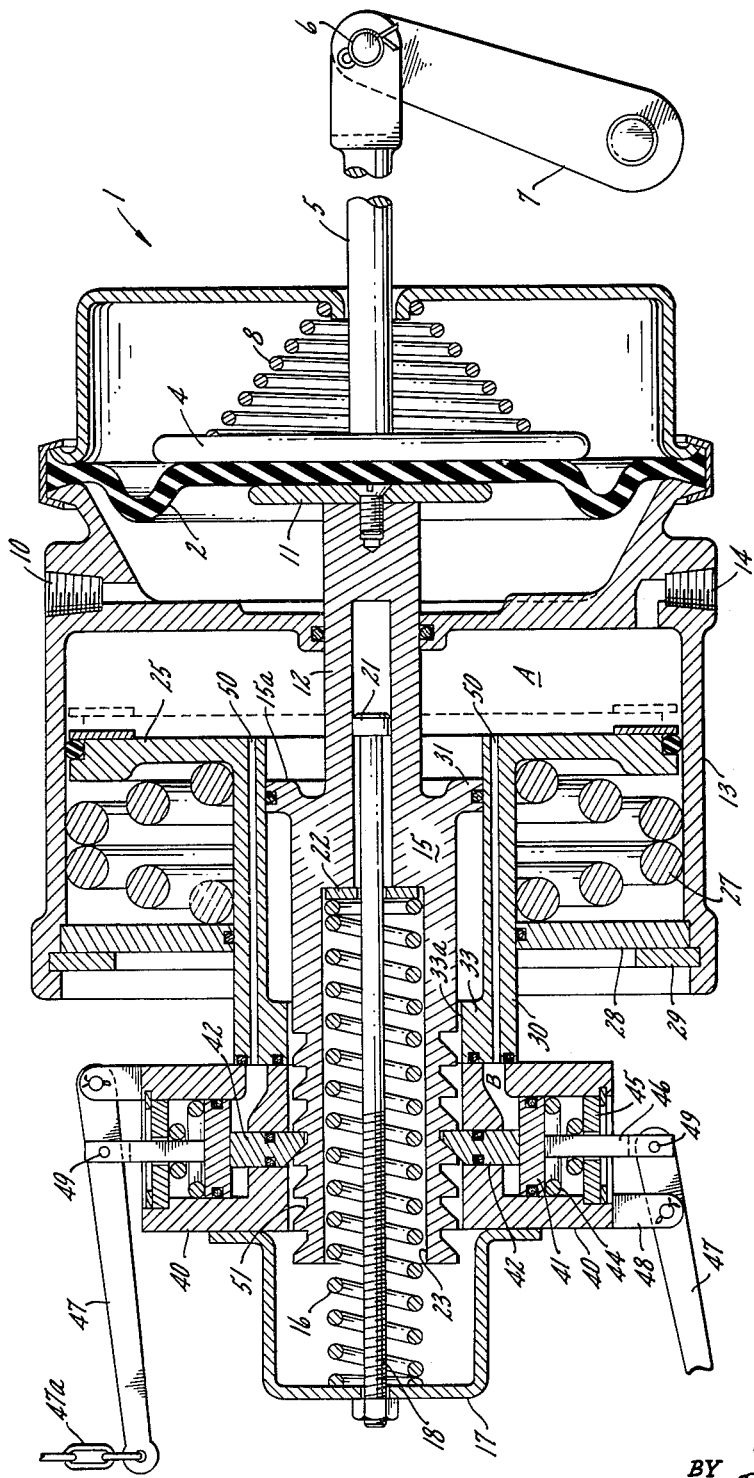
FIGURE 2 is a view similar to that of FIGURE 1 with the parts shown in another position.
Figure 3:
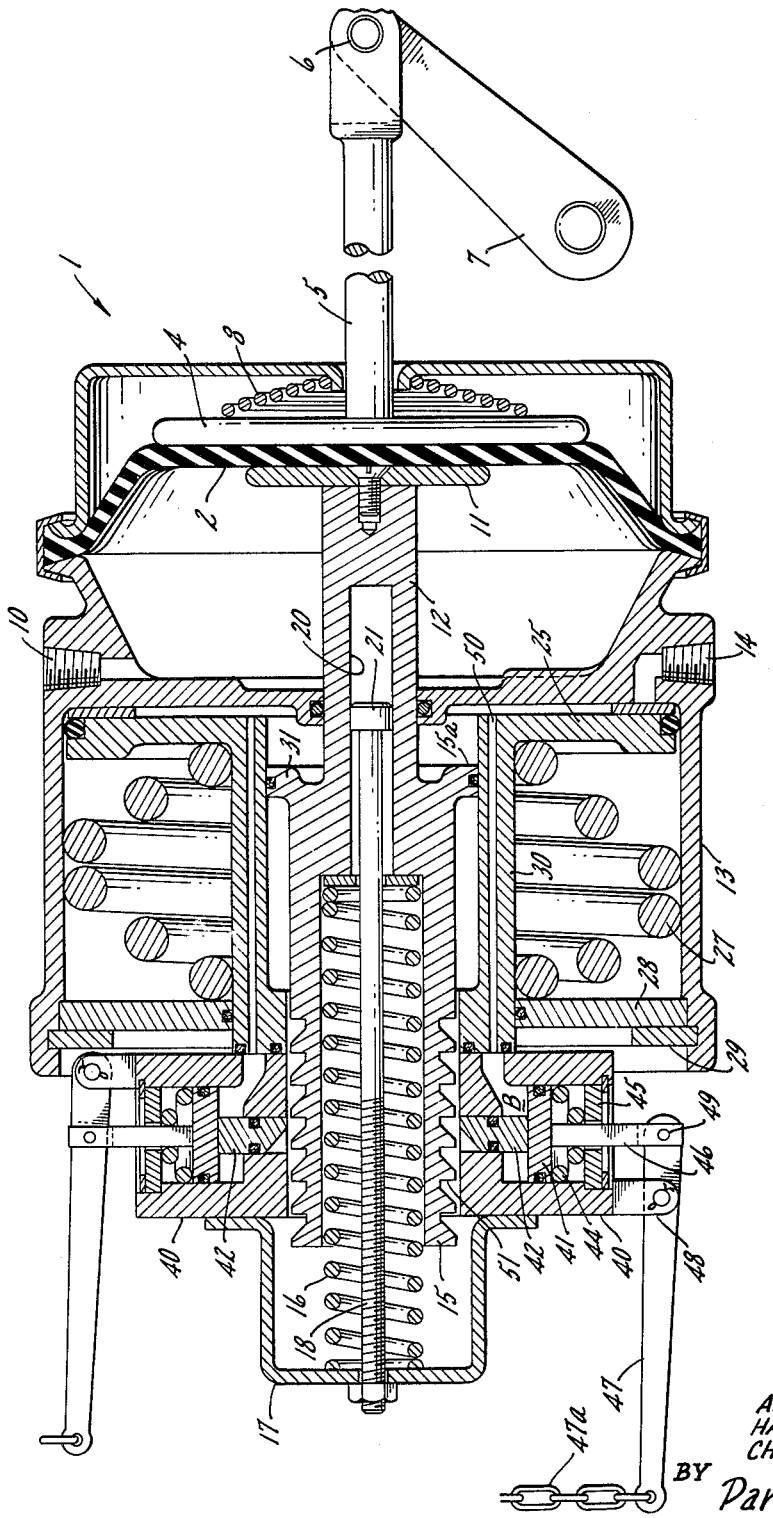
FIGURE 3 is a view similar to that of FIGURE 1 with the parts shown in a third position.

The use and operation of the invention are as follows:

As best seen in FIGURES 1, 2 and 3, the structure there illustrated is effective initially to take up the slack in a brake system while the action of brake-applying spring 27 is delayed. Upon diminution of fluid pressure in chamber A to a predetermined level, as shown in FIGURE 2, the piston 15, the forward surface 15a of which is exposed to the pressure in chamber A, moves toward chamber 1, the surface 15a being of substantially smaller area than the surface of piston 25 which is exposed to the pressure in chamber A. The spring 16 is of predetermined strength-relationship to the pressures in chamber A. Upon further diminution of fluid pressure in chamber A, below said predetermined level, the pressure in chamber B which is in communication with chamber A through passage 50, is reduced to a point permitting spring 44 to move piston 41 and lock bolts or keepers 42 inwardly toward piston 15 and rack 51, the rack 51 having been moved into alignment with the bolts 42 when piston 15 moved to absorb the slack in the brake system. With this reduction in pressure in chamber A to a second predetermined level, the spring 27 is now effective to apply the brakes. As indicated in dotted lines in FIGURE 2, the stroke of spring 27 and consequently the movement of piston 25 toward full brake-applying position is of substantially limited duration. Since the slack has been entirely take up by movement of piston 15, the full force of spring 27 is employed in the actual braking action on the vehicle. This braking action may involve only the compression of brake shoe material against the brake drum on a wheel and the amount of piston movement may therefore be almost undiscernable. The same is true, of course, with respect to the more or less diagrammatic showings of piston movement in FIGURES 5, 8 and 12. Since the piston 25 is locked to piston 15 through means 42 prior to the action of spring 27, the movement of piston 25 by spring 27 carries with it piston 15 and consequently rod 12 and pad 11 to apply the brakes through diaphragm 2, pad 4, rod 5 and lever 7.

FIGURE 3 illustrates the parts in a position of maximum travel. With the brakes disconnected or, perhaps, at maximum point of wear the piston 25 may travel its maximum distance as shown. Though, once installed, and so long as the brake system remains connected to rod 5, it is not expected that piston 25 would be required to traverse the full distance available. Thus, the length of cylinder 13, as shown, may be even further reduced. Similarly, the elements outside of cylinder 13, and to the left thereof as the parts are shown in the drawings, may in practice be relatively smaller in both length and diameter, it being necessary, for clarity, to show parts of sufficient size herein. Since cylinder 13 is the item of major diameter it tends to control the space limitation problem in installation and a reduction in its length provides an important step and advantage.

When air pressure is again supplied to chamber A, the parts are returned to the position illustrated in FIGURE 1, the levers 47 being operated by lanyards 47a to retract the bolts 42, as shown in FIGURE 3.

It will be understood that the brake systems referred to herein may include a brake drum rotatable with the vehicle wheel and a brake shoe component movable into engagement with the inner drum surface, the frictional engagement of the shoe and drum being under sufficient pressure to stop the drum and wheel rotation. Reference to slack-absorbing will thus be understood as encompassing the absorption of any slack in the connections and elements of the brake applying system and the movement thereof required to move the brake shoe from its inoperative position, in which it is spaced from the brake drum, to its operative position in contact with the brake drum. Similarly, the brake-applying references will be understood as devoted to the application of force to press the brake shoe against the brake drum after it has been brought into contact therewith.

Whereas a preferred embodiment of the invention has been illustrated and described, it will be understood that further modifications will suggest themselves to those skilled in the art upon a reading of the foregoing description should be taken as merely illustrative and not definitive, and the scope of the invention should be limited only by the following appended claims.

We claim:

1. For use with a brake-operating mechanism having brake-operating elements therein normally operated by fluid pressure, there being some slack in said elements, an emergency means for moving said elements, said means comprising a cylinder, a first piston in said cylinder, an extension on said piston extending outwardly of said cylinder, a second piston in said cylinder, means for delivering fluid pressure to the area within said cylinder to urge said pistons in one direction, yielding means of one predetermined force operative against said first piston to urge the same in the opposite direction, yielding means of a greater predetermined force positioned in said cylinder to urge said second piston in said opposite direction and locking means effective to lock said second piston to said first piston after an initial excursion of said first piston in said opposite direction.

2. A brake-operating mechanism including brake-operating elements, means for normally operating said elements in response to the application of fluid pressure and emergency means for operating said elements in response to a diminution of fluid pressure, said emergency means comprising a cylinder, an operating rod extending outwardly from said cylinder for operating contact with said operating elements, yielding means positioned in said cylinder to urge said rod toward said operating elements at one predetermined force in response to diminution of fluid pressure in said cylinder to a predetermined level, a piston reciprocal in said cylinder, a second yielding means of a greater predetermined force positioned to urge said piston toward said operating elements in response to diminution of fluid pressure in said cylinder to a second predetermined level and means for securing said piston to said rod in response to diminution of fluid pressure within said cylinder to said second predetermined level.

3. The structure of claim 2, characterized by and including means for releasing said piston from said rod.

4. In an emergency brake-operating device a cylinder, a piston reciprocal in said cylinder, an extension on said piston extending outwardly from said cylinder, yielding means of predetermined force positioned to urge said piston in one direction, a second piston reciprocal in said cylinder, a second yielding means of a greater predetermined force positioned to urge said second piston in said direction, an inlet formed in said cylinder and positioned to deliver fluid pressure thereinto to urge said pistons in the opposite direction, and means for locking said pistons together in response to diminution of fluid pressure within said cylinder below a predetermined level.

5. The structure of claim 4 wherein said locking means comprises a mating surface formed on said first piston, a keeper having a mating surface and carried by said second piston, a third yielding means positioned to urge said keeper toward said piston mating surface, a chamber carried by said second piston, said keeper having a portion reciprocal in said chamber, and passage means formed in said second piston to place said cylinder in communication with said chamber and to deliver fluid pressure from said cylinder to said chamber to urge said keeper away from said piston mating surface.

6. The structure of claim 5 wherein said piston mating surface comprises an inclined surface on said first piston, said keeper comprises a wedge element carried by said second piston, and characterized by and including a wedge-operating means carried by said second piston, said third yielding means being positioned to urge said wedge-operating means in one direction to move said wedge element toward said inclined surface, a portion of said wedge-operating means being reciprocal in said chamber.

7. The structure of claim 5 wherein said piston mating surface comprises a ratchet, said keeper comprises a finger element having a chamfered end surface formed and adapted to mate with portions of said ratchet, and said keeper portion in said chamber comprises a third piston, said third yielding means being positioned on one side of said third piston, said passage being in communication with said chamber on the opposite side of said third piston.

8. For use in a fluid pressure brake system having a source of fluid pressure, a cylinder, a piston in said cylinder, motor means communicating with the source of fluid pressure and having an operating engagement with said piston and cylinder, said means being formed and adapted to deliver a predetermined force to said piston to move the same toward brake-operating position in response to initial diminution of said fluid pressure and to deliver a greater predetermined force to said piston to move the same toward brake-operating position in response to further diminution of said fluid pressure.

9. An emergency brake-operating assembly comprising a cylinder, a first piston reciprocal in said cylinder and carrying a rod extending outwardly from said cylinder, said first piston having an inclined surface, a second piston reciprocal on said cylinder, a wedge carried by said second piston, means carried by said second piston for urging said wedge into engagement with said inclined surface, yielding means of one force engaging said second piston and said first piston to urge said first piston in one direction, yielding means of a greater force engaging said cylinder and said second piston to urge said second piston in said direction.

10. An emergency brake-operating assembly comprising a cylinder, a first piston reciprocal in said cylinder and carrying a rod extending outwardly from said cylinder, said first piston having an inclined surface, a second piston reciprocal on said cylinder, a wedge carried by said second piston, means carried by said second piston for urging said wedge into engagement with said inclined surface, yielding means of one force engaging said second piston and said first piston to urge said first piston in one direction, yielding means of a greater force engaging said cylinder and said second piston to urge said second piston in said direction, a fluid pressure inlet positioneed in said cylinder to supply fluid pressure to said first and second pistons and to urge the same in the opposite direction, a chamber carried by said second piston passage means formed in said second piston and communicating with said chamber and the area within said cylinder to which said fluid pressure is delivered, said wedge-operating means having a portion reciprocal in said chamber and a third yielding means engaging said chamber and said wedge-operating means portion to urge said wedge-operating means in wedge-operating direction in response to diminution of fluid pressure within said chamber.

References Cited by the Examiner

UNITED STATES PATENTS

| 920,389 | 5/1909 | Rae | 303—6 |
|---|---|---|---|
| 2,671,470 | 3/1954 | Boteler | 303—6 X |
| 2,754,805 | 7/1956 | Beman | 303—6 X |
| 2,829,498 | 4/1958 | Ferguson | 60—54.5 |
| 2,886,950 | 5/1959 | Hause | 60—54.6 |
| 2,937,622 | 5/1960 | Brimhall | 92—63 X |
| 2,997,850 | 8/1961 | Hupp | 60—54.5 |
| 3,020,094 | 2/1962 | Murty et al. | 303—6 X |
| 3,062,591 | 11/1962 | Brimhall | 303—6 |
| 3,065,997 | 11/1962 | Frankhouser et al. | 303—6 |

SAMUEL LEVINE, *Primary Examiner.*

ROBERT R. BUNEVICH, *Examiner.*